US008686855B2

(12) United States Patent
Popovski (10) Patent No.: US 8,686,855 B2
(45) Date of Patent: Apr. 1, 2014

(54) EMBEDDED RFID RECORDER IN SHORT-RANGE WIRELESS DEVICES (75) Inventor: Petar Popovski, Smørum (DK)

(73) Assignee: Oticon A/S, Smorum (DK)

(*) Notice: Subject to any disclaimer, the term of this patent is extended or adjusted under 35 U.S.C. 154(b) by 646 days.

(21) Appl. No.: 12/443,366

(22) PCT Filed: Oct. 22, 2008

(86) PCT No.: PCT/EP2008/064286
§ 371 (c)(1),
(2), (4) Date: Mar. 27, 2009

(87) PCT Pub. No.: WO2010/045972
PCT Pub. Date: Apr. 29, 2010

(65) Prior Publication Data
US 2010/0302005 A1 Dec. 2, 2010

(51) Int. Cl.
G08B 13/14 (2006.01)

(52) U.S. Cl.
USPC .......... 340/572.1; 340/572.2; 340/10.1; 340/10.2; 370/252

(58) Field of Classification Search
USPC .......... 340/10.1, 10.2, 5.61, 572.1, 527.2, 340/527.3, 572.2, 572.3; 370/206, 252
See application file for complete search history.

(56) References Cited

U.S. PATENT DOCUMENTS

| 5,929,779 | A* | 7/1999 | MacLellan et al. ........ 340/10.2 |
| 2003/0072252 | A1* | 4/2003 | Gurney et al. ............... 370/206 |
| 2003/0151524 | A1* | 8/2003 | Clark ....................... 340/870.07 |
| 2004/0263319 | A1* | 12/2004 | Huomo ...................... 340/10.2 |
| 2006/0223448 | A1 | 10/2006 | Kruys |
| 2006/0290473 | A1* | 12/2006 | Mahasenan et al. ........ 340/10.2 |
| 2007/0001851 | A1* | 1/2007 | Reynolds et al. .......... 340/572.1 |
| 2007/0040682 | A1* | 2/2007 | Zhu et al. .................. 340/572.1 |
| 2007/0063818 | A1 | 3/2007 | Witherspoon et al. |
| 2007/0141997 | A1 | 6/2007 | Wulff et al. |
| 2007/0167139 | A1* | 7/2007 | Inano et al. ..................... 455/88 |
| 2008/0084306 | A1* | 4/2008 | Durtschi et al. ........... 340/572.1 |
| 2008/0100447 | A1* | 5/2008 | Powell ...................... 340/572.2 |
| 2008/0110989 | A1 | 5/2008 | Shanks |
| 2008/0174405 | A1 | 7/2008 | Toorn |
| 2008/0186136 | A1* | 8/2008 | Raphaeli et al. ............. 340/10.1 |
| 2008/0197976 | A1* | 8/2008 | Littlechild et al. .......... 340/10.1 |
| 2008/0290995 | A1* | 11/2008 | Bruns et al. ................. 340/10.1 |
| 2009/0033497 | A1* | 2/2009 | Wyatt et al. ................ 340/572.1 |
| 2009/0040040 | A1* | 2/2009 | Ben-Itzhak et al. ..... 340/539.13 |
| 2009/0322551 | A1* | 12/2009 | Kanagala et al. ......... 340/825.72 |

FOREIGN PATENT DOCUMENTS

WO WO-2005/096651 A1 10/2005
WO WO-2007/060494 A1 5/2007

* cited by examiner

Primary Examiner — Hoi Lau
(74) Attorney, Agent, or Firm — Birch, Stewart, Kolasch & Birch, LLP (57) ABSTRACT The invention relates to a portable communications device. The invention further relates to its use of and to a method of operating it. The object of the present invention is to facilitate adaptation of a communications device to its present environment, e.g. to facilitate spectrum sharing in short range communication devices. The problem is solved in that the portable communications device comprises a wireless communications interface for communicating with another device, a memory and an RFID-recorder for receiving an RFID-signal transmitted from an RFID-interrogator, wherein the device is adapted for storing individual received RFID-signals in the memory. An advantage of the invention is that it provides a relatively simple scheme for extracting information from a current environment of a portable communications device. The invention may e.g. be used for adapting listening devices, e.g. hearing instruments, headphones, or head sets to local, e.g. country specific, conditions or to operate in an efficient way under given interference conditions.

18 Claims, 5 Drawing Sheets

| RFID-signal> |
|---|
| ignal 1 |
| ignal 2 |
| ignal 3 |
| ignal 4 |
| ... |
| ... |
| ignal n |

FIG. 6a

| RFID-signal> | Order#> |
|---|---|
| signal 1 | 1 |
| signal 2 | 2 |
| signal 3 | 3 |
| signal 4 | 4 |
| ... | |
| ... | |
| signal n | n |

FIG. 6b

| RFID-signal> | TimeStamp> |
|---|---|
| ignal 1 | Time 1 |
| ignal 2 | Time 2 |
| ignal 3 | Time 3 |
| ignal 4 | Time 4 |
| ... | |
| ... | |
| ignal n | Time n |

FIG. 6c

| RFID-signal> | TimeStamp> | Characteristics> Channel> | Characteristics> DutyCycle> |
|---|---|---|---|
| ignal 1 | Time 1 | Channel 5 | 10% |
| ignal 2 | Time 2 | Channel 5 | 12% |
| ignal 3 | Time 3 | Channel 7 | 40% |
| ignal 4 | Time 4 | Channel 5 | 11% |
| ... | | | |
| ... | | | |
| ignal n | Time n | Channel 7 | 38% |

FIG. 6d

| RFID-signal> | TimeStamp> | Characteristics> | Context> |
|---|---|---|---|
| | | Channel> | CountryCode> |
| ignal 1 | Time 1 | Channel 5 | US |
| ignal 2 | Time 2 | Channel 5 | US |
| ignal 3 | Time 3 | Channel 7 | US |
| ignal 4 | Time 4 | Channel 5 | US |
| ... | | | |
| ... | | | |
| ignal n | Time n | Channel 3 | DK |

FIG. 6e

| RFID-signal> | TimeStamp> | Context> | Context> |
|---|---|---|---|
| | | CountryCode> | Text> |
| ignal 1 | Time 1 | US | Ch#5-10 free |
| ignal 2 | Time 2 | US | Ch#5-10 free |
| ignal 3 | Time 3 | US | Ch#7-10 free |
| ignal 4 | Time 4 | US | Ch#7-10 free |
| ... | | | |
| ... | | | |
| ignal n | Time n | DK | Ch#1-4 free |

FIG. 6f

EMBEDDED RFID RECORDER IN SHORT-RANGE WIRELESS DEVICES

TECHNICAL FIELD

The present invention relates to the use of information aimed at RFID tags in short range wireless devices, e.g. portable communications devices, e.g. listening devices, such as hearing aids. The invention relates specifically to a portable communications device.

The invention furthermore relates to use of a portable communications device and a system. The invention furthermore relates to a method of operating a portable communications device. The invention additionally relates to a data processing system and to a computer readable medium.

The invention may e.g. be useful in applications such as listening devices, e.g. hearing instruments, headphones, or head sets.

BACKGROUND ART

In the recent years there has been a large growth in the usage of wireless devices and systems that operate in unlicensed ISM-like spectra (ISM=Industrial, Scientific and Medical) as e.g. defined by the ITU Radiocommunication Sector (ITU-R). Examples are Wi-Fi-, Bluetooth-devices, home automation devices, etc. The volume of the unlicensed wireless devices and the variety of their applications is expected to grow further in the coming years, including in the field of medical devices, e.g. hearing aids, etc. However, the largest portion of the unlicensed devices in the future is likely to belong to the Radio Frequency Identification (RFID) systems. It is expected that the RFID readers and networks will be deployed everywhere in order to communicate with the billions of RFID tags attached to humans, objects, animals, etc.

The basic paradigm for operation in the unlicensed bands is that the devices should apply techniques in order to avoid radio interference with signals (a) received from other devices and (b) transmitted towards other devices. For example one mechanism to achieve that can be the following: If a device that wants to transmit detects that there is an ongoing transmission, it backs off and does not start its transmission for some (random) time. This is the principle of "Listen-Before-Talk". In another example, a device that detects that there is an ongoing transmission on Channel M, will switch to a different Channel N and try to perform the communication in that channel. In general, the devices are trying to access the spectrum efficiently, which means that we want to achieve a situation where as many devices as possible are succeeding to simultaneously send their information successfully to the intended receivers.

An example of an efficient spectrum usage is outlined in the following. There are two persons, A and B, and each of them wants to have his or her headset to communicate with his or her mobile phone. The communication is done by sending data packets from the headset to the mobile and vice versa. If these two persons are standing next to each other, then it is not possible to transmit packets for the person A and person B simultaneously (on the same communications channel), because they will be destroyed in mutual interference. One way to go around this is that the mobile of A agrees with the mobile of B to use the communication channel by time sharing and agree in which time periods the devices of A will use it and in which period the devices of B will use it. Another way would be that A and B agree to use different channels and thus avoid the mutual interference.

However, achieving such a spectrally efficient operation is a difficult problem. In the previous example, it is likely that the mobiles of A and B are not able or not willing to communicate with each other, and thus they cannot agree on how to share the usage in time or to shift channels. Therefore, there is a lot of ongoing research into the techniques that facilitate efficient spectrum sharing and utilization. This requirement becomes particularly important for the 863-870 MHz band, as the number of short-range devices (SRDs) in that region will proliferate in the coming years, including future medical devices, such as hearing instruments.

A particular problem in the 863-870 MHz band is that the short-range devices will have to share the wireless medium with the transmission of the RFID reader (interrogator) devices. This is because the RFID interrogators will use much larger power than the short range devices. This is causing an undesirable asymmetric situation: Many SRDs will suppress their transmission or will be compelled to change the communication channel after detecting the interference caused by the RFID readers, while, on the other hand, their transmission will likely not disturb the communication within the RFID system.

US 2007/0063818 deals with a radio-frequency identification system comprising a radiofrequency identification tag and an interrogator. In one embodiment, the interrogator is configured to determine a nature of a received signal in a frequency channel and to selectively enable transmission of an interrogation signal in the frequency channel based on the determined nature of the received signal. In another embodiment, the interrogator is configured to select an interrogation frequency channel based on whether interference is likely to occur due to signals in the selected channel and/or signals in adjacent frequency channels.

DISCLOSURE OF INVENTION

However, there is a way around it and the present patent application proposes a method for turning the RFID systems from an interference threat into an interference avoidance asset. One has to observe that the RFID reader communicates with inexpensive RFID tags (or recorders) which will increasingly be embedded in a wide range of devices.

An object of the present invention is to facilitate adaptation of a communications device to its present environment, e.g. to facilitate spectrum sharing in short range communication devices. Another object of the invention is to utilize recorded information from RFID readers (interrogators) in order to facilitate context-dependent decisions.

In the present application the terms 'RFID reader' and 'RFID interrogator' are used interchangeably for the part of an RFID-system for remotely retrieving data from active or passive RFID transponders or tags. The RFID reader/interrogator transmits an interrogating signal to the tags and receives a response containing information stored in individual tags, e.g. an identification of the tag or any other piece of information.

The main idea of the present application is to embed one or more RFID recorders (basically specific RFID tags, but here more generally termed 'RFID recorders'), capable of receiving signals from an RFID-interrogator/reader in a short range device and use it to collect information about the surrounding RFID readers. Typically, the response function of a normal RFID tag, when it receives a valid signal from an RFID reader, is disabled in an RFID recorder of a portable communications device according to the present invention. One can think of the RFID recorder or RFID tag as an "external memory", where the RFID readers can write information that is subsequently taken into an internal memory of the short-range wireless device. The information written into the memory can be used for a variety of purposes, e.g. in order to facilitate the decisions for spectrum usage, but also many other usages. In future wireless portable communication systems, the tag (or recorder) can be a part of a remote-control device that is used to control another device, e.g. a listening device, such as one or more (e.g. two or more) hearing instruments (HIs) of a hearing aid system.

Typically an RFID tag comprises an antenna for receiving and transmitting an RF signal and a circuit for demodulating and modulating (and possibly storing) a demodulated information signal.

The term a 'short range device' (SRD) is in the present context taken to mean a device capable of communicating with another device over a relatively short range, e.g. less than 50 m, such as less than 20 m, such as less than 5 m, such as less than 2 m or in a sense as used in the ERC Recommendation 70-03, February 2008.

The basic usage of the idea is as follows: When a short-range device detects interference, it reads the memory location which corresponds to the content that is read by its embedded RFID recorder. That information can e.g. be used as an input to any (generic) algorithm e.g. for deciding which frequency channel to be used in the current environment in order to achieve spectrally efficient operation. Interference can be detected in several ways, for example by measuring the packet error probability (PEP) and claim existence of interference if PEP is above a predefined threshold. Alternatively, interference can be identified by measuring the received power in the absence of a useful signal from the other communicating party, by number of failed consecutive attempts for medium access when LBT (Listen Before Talk) is used, etc.

An application of the idea can be that the device records a whole recent history of the received signals from RFID readers. This can help either to improve the decisions on spectrum usage, or to get some additional information that can facilitate the overall system operation, such as location information or context-information.

Objects of the invention are achieved by the invention described in the accompanying claims and as described in the following.

An object of the invention is achieved by a portable communications device. The communications device comprises a wireless communications interface for communicating with another device, a memory and an RFID recorder for receiving an RFID-signal transmitted from an RFID-interrogator, wherein the portable communications device is adapted for storing individual received RFID-signals in the memory.

An RF signal transmitted by an RFID reader typically comprises an information or code modulated on a carrier. The received RFID-signal stored in the memory can in general be in any appropriate form, e.g. as a waveform (amplitude vs. time), e.g. a digitized signal, e.g. comprising one or more frames or some sort of extracted parameter ('characteristics'). The RFID-signal stored can e.g. be the decoded information that is carried (e.g. within a packet) by the RF signal transmitted by an RFID reader. Such information may be supplemented by timestamp, information on the received power from the RFID reader, the exact frequency where it has been received, whether AFTER receiving the information from the RFID reader, there has been detected energy (from the tags that reply), etc.

An advantage of the invention is that it provides a relatively simple scheme for extracting information from a current environment of a portable communications device. A further advantage is that it provides a scheme for an improved spectrum sharing between RFID systems (RFID readers and corresponding RFID-tags) and portable communications devices competing for the same frequency spectrum. An efficient spectrum usage at a given geographical location at any given time is an advantage for the RFID systems as well as for the portable communications devices.

The term 'a wireless communications interface' is in the present context taken to mean transmitter and/or receiver units adapted for communicating wirelessly with corresponding receiver and/or transmitter units located in another, spatially separate device, different from the RFID reader/interrogator.

In a particular embodiment, the portable communications device is adapted to store a sequential indicator, e.g. an order or an indicator of the time, such as a time stamp, of reception of the individual stored RFID signals. This has the advantage of facilitating relevant statistical analysis of the characteristics of the received RFID-signals.

In an embodiment, the RFID recorder is adapted for receiving RFID signals from one or more RFID tags, e.g. 2 or 3 or 4 or 5 or more RFID tags.

In an embodiment, the RFID recorder is adapted to record signals in an unlicensed frequency range. In an embodiment, the RFID recorder is adapted to record signals in the band from 863 MHz to 870 MHz, such as from 865 MHz to 868 MHz or alternatively around 2.4 GHz.

In an embodiment, the RFID recorder is coupled to an RFID read/write module specifically adapted for extracting from the RFID recorder an RFID signal received by the RFID recorder and specifically adapted for writing it to the memory. In an embodiment, RFID read/write module is adapted to extract from the RFID recorder the information signal demodulated from the RF signal received from the RFID reader in question and to store it in the memory.

In an embodiment, the portable communications device comprises a channel identification unit that identifies the channel used by a particular RFID reader whose signal is received by the RFID recorder. In an embodiment, the channel identification unit is adapted to be able to identify a channel in a predetermined frequency range.

In an embodiment, the portable communications device comprises a processing unit. In an embodiment, the processing unit is adapted to govern details of the extraction and storage of signals received by the RFID recorder in the memory (e.g. the time between each individual extraction of RFID signals from the RFID recorder). In an embodiment, the processing unit is adapted to be able to add information to individual records of RFID signals in the memory, e.g. context related information, location information, time information, etc.

In a particular embodiment, the processing unit is adapted for analyzing at least some of the RFID-signals stored in the memory. In an embodiment, the processing unit is connected to the RFID read/write module for exchanging information therewith. In an embodiment, the processing unit is connected to the memory for exchanging information therewith.

In a particular embodiment, the processing unit is adapted to analyze a currently received RFID-signal, compare it with possible already stored RFID-signals. In an embodiment, processing unit and/or the read/write module is/are adapted to only store the currently received RFID-signal if it differs from already stored RFID-signals. Thereby memory usage can be minimized.

In a particular embodiment, the processing unit is adapted to keep track of the frequency of occurrence of a particular RFID-signal, such as of all the different RFID-signals stored in the memory.

In a particular embodiment, the processing unit is adapted to analyze characteristics of a received RFID-signal.

In a particular embodiment, the characteristics of a received RFID-signal are selected from the group comprising, transmission frequency or frequency range or channel, length in time of bursts, length in time of idle periods, contextual information, and combinations thereof. Contextual information can e.g. be the GPS coordinates of the detecting device at the moment when it has detected the RFID signal, or any other context-related information embedded in the RFID signal (e.g. that the RFID reader belongs to police or customs authority).

In a particular embodiment, the characteristics of a received and stored RFID-signal are stored in a memory and linked to the RFID-signal in question. This has the advantage that relevant parameters for each received signal can be easily compared.

In a particular embodiment, the processing unit is adapted to analyse and extract particular information contained in a received RFID-signal, e.g. in the characteristics of the received RFID-signal, e.g. in contextual information. This can e.g. be a country code or details about available frequency channels (e.g. usable channels, time frame of their use, etc.). In an embodiment, the information about the country code is used in order to apply the rules for radio operation that are compliant with the regulatory requirements for that country, such as selection of the operating frequency range, transmitting power, mode of frequency hopping, etc.

In a particular embodiment, the portable communications device is adapted to extract information from the stored RFID signals to identify the kind of RFID reader system having transmitted the RFID signal in question (i.e. e.g. identifying the duty cycle, the channel usage pattern, the expected reply of a responding tag at the same or a different channel etc.). In an embodiment, this information is used as input to an algorithm for efficient selection of operating channel for the communications device.

In an embodiment, the portable communications device is adapted to receive RFID signals from a number of predefined RFID readers. In an embodiment, the portable communications device comprises a database with information identifying the kind of RFID reader systems from which it is able to receive RFID signals. In an embodiment, the portable communications device is adapted to combine information received from currently proximate RFID readers with the information of the database. In an embodiment, the portable communications device is adapted to combine such information with other available information, such as information on location (e.g. from a positioning system, e.g. GPS) and/or on the time. In an embodiment, the portable communications device is adapted to receive RFID signals from RFID readers indicating a location (e.g. a country or an area) or a specific type of environment, e.g. an airport or a particular kind of shop.

In a particular embodiment, the wireless communications interface for communicating with another device comprises a selectable reception frequency range or channel and a selectable, possibly different, transmission frequency range or channel.

In a particular embodiment, the portable communications device is adapted to use results of the analysis of the characteristics of the received RFID-signals to influence or control communication or functionality of the communications device, e.g. to influence a processing algorithm e.g. for selecting or changing one or more processing parameters or to select a particular set of (e.g. previously stored) processing parameters or a particular processing program.

In a particular embodiment, the portable communications device is adapted to select an appropriate frequency range or channel for communication with another device in dependence of the results of the analysis of the characteristics of the received RFID-signals.

In a particular embodiment, the processing unit is adapted to generate a frequency control signal based on the results of the analysis of the characteristics of the received RFID-signals.

In a particular embodiment, the portable communications device is adapted to select an appropriate frequency range or channel for communication with another device in dependence of the frequency control signal.

In an embodiment, the portable communications device is adapted to be able to compare the present time with the time of reception of individual stored RFID signals. In a particular embodiment, the portable communications device is adapted to extract a time difference between the time of reception of two stored RFID signals or between the current time and the time of reception of a stored RFID signal.

In an embodiment, the portable communications device is adapted to use the extracted information about frequency or channel usage of specific received RFID signals and/or an expected reply of a responding tag at the same or a different channel in combination with a time stamp of said RFID signals to avoid the usage for transmission and/or reception of such frequencies or channels for a specific minimum period of time, $T_{min}$, from the last detected use. In an embodiment $T_{min}$>30 s, such as >60 s, such as >120 s, such as >1000 s.

In an embodiment, the identification of frequency or channel usage of proximate RFID systems is based on more than one occurrence, such as on a multitude of occurrences, such as on statistical analysis of stored RFID signals and possibly related linked information.

In an embodiment, the portable communications device is adapted—in a receiving mode—to scan a certain bandwidth of the spectrum (e.g. an unlicensed part of the spectrum, e.g. 865-868 MHz) for a certain period (e.g. 10 s or 20 s) in order to find out which of the RFID channels are used by the proximate RFID system. In an embodiment, the portable communications device is adapted use this information to control the use of transmission and/or reception channels of the portable communications device. This can e.g. be to suppress the use of the identified channels used by an RFID-system (e.g. comprising an RFID-interrogator and its corresponding RFID tags) and to allow the use of channels NOT used by the RFID-system. In an embodiment, this scheme is coupled with a minimum time constant from the last detected usage (e.g. from the last scan) of the frequency channels in question to disallow such usage if less than a predefined time has passed since such detected usage.

In a particular embodiment, the portable communications device comprises a remote control and/or an audio transmission device for transmitting an audio signal to a receiving device ('another device' in the above sense), e.g. a listening device, such as a headset or a pair of head phones or one or more hearing instruments.

In a particular embodiment, the portable communications device comprises at least one listening device, such as a headset or a hearing instrument. In a particular embodiment, the portable communications device comprises at least one hearing instrument adapted to be worn at or in an ear of a user, e.g. a BTE or ITE instrument.

Use of a portable communications device as described above, in the section on mode(s) for carrying out the invention and in the claims is furthermore provided by the present invention. In an embodiment, use together with an RFID system, e.g. including an RFID reader, is provided.

In an aspect of the invention a portable communications system is provided, the system comprising two portable communications devices, at least one of which (e.g. both) being a portable communications device as described above, in the section on mode(s) for carrying out the invention and in the claims. In an embodiment, one portable communications device is an audio transmission device for transmitting an audio signal to a second portable communications device, the second portable communications device being a listening device, where said audio transmission device and said listening device each comprise said wireless communications interface enabling establishing a wireless link between said devices in frequency ranges or channels based on the analysis of the characteristics of the received RFID-signals.

In an aspect of the invention a system is provided, the system comprising and RFID reader and at least one portable communications device, the RFID reader being adapted to transmit an information (such as a country or area code representative of the current country or area, wherein the RFID reader is located) to the portable communications device as described above, in the section on mode(s) for carrying out the invention and in the claims. The portable communications device is adapted to receive the information (e.g. a country code). In an embodiment, the transmit power level of the RFID reader is restricted to a relatively low power, e.g. ≤5 W, such as ≤2 W. In an embodiment, the RFID system is adapted to use an unlicensed part of the frequency spectrum, such as between 863 MHz and 870 MHz or such as around 2.4 GHz. In an embodiment, the bandwidth of a transmission channel of the RFID system is ≤500 kHz, such as ≤300 kHz, such as ≤200 kHz. In an embodiment, the portable communications device is adapted to use the information (e.g. country code) to perform an action. In an embodiment, the portable communications device is adapted to select a transmit and/or receive frequency, frequency range or channel for its wireless interface for communication with another device than the RFID reader. In an embodiment, the information relates to a type of equipment located in the vicinity of the portable communications device. In an embodiment, the type of equipment is an entertainment device, e.g. a TV. In an embodiment, the system is adapted to provide that the action performed by the portable communications device is to setup a transmission channel from the entertainment device to the portable communications device. In an embodiment, the transmission channel from the entertainment device to the portable communications device comprises video and/or audio. In an embodiment the portable communications device comprises a listening device, e.g. a hearing instrument or a headset.

In an aspect of the invention, a method of operating a portable communications device is provided, the method comprising
A) embedding an RFID recorder in a portable communications device (which typically does not posses capabilities for receiving RFID signals or transmitting RFID interrogator messages);
B) use the RFID recorder as a "sniffing" point for surrounding RFID signals to pick up information about the geographical (country) location of the communications device or any other type of information (advertising, assistance information, etc.) that is emitted by proximate RFID readers. Such a tag (or RFID recorder) can capture the information sent by the neighbouring RFID readers and use it:

To monitor the RFID signals in the environment in order to provide information that will facilitate efficient decisions on spectrum usage, and/or
As a "bulletin board" where a neighbouring RFID interrogator can write some information that can be used for spectrum sharing or more general context information. For example, at the border crossing, this tag can capture the country code of the country which the user visits and thus determine e.g. the allowed frequencies and power levels to be used (otherwise, this has to be done manually).

The term 'capture' a signal is in the present context taken to include 'receiving' and 'decoding' the signal.

A method of operating a portable communications device is moreover provided by the present invention, the method comprising
a) capturing one or more RFID signals surrounding the portable communications device;
b) storing said one or more RFID signals together with a sequential indicator;
c) analysing the stored RFID-signals.

In a particular embodiment, the method comprises extracting information from the stored RFID signals facilitating decisions to be made on spectrum usage in the environment surrounding the portable communications device.

In a particular embodiment, the method comprises extracting information from the stored RFID signals identifying the kind of RFID reader system having transmitted the RFID signal in question (i.e. e.g. identifying the duty cycle, the channel usage pattern, the expected reply of a responding tag at the same or a different channel, etc.). In an embodiment, this information is used as inputs to an algorithm for efficient selection of operating channel for the communications device.

In a particular embodiment, the method comprises extracting a country code of the country of location of the portable communications device from the captured RFID-signals. In a particular embodiment, the method comprises determining the allowed frequencies and power levels to be used in a wireless communication interface to another device from the captured RFID-signals. In case the portable communications device is an audio transmission device (e.g. a music player or an audio selection device for transmitting a selected one of a multitude of audio signals), the other device can e.g. be a head set, a pair of headphones or one or more hearing instruments. In case the portable communications device is a hearing instrument, the other device can e.g. be another hearing instrument.

In a particular embodiment, the sequential indicator is an order number indicating an order of occurrence or a time stamp indicating the point in time of the captured RFID-signals. This has the advantage that the RFID signals can be analysed with a view to order or time of occurrence. When a time stamp is recorded, the relative time difference between the capture of two signals (or between the current time and the capture of a particular RFID signal) can be determined and used as an input to a decision.

The term to 'record' a signal or a piece of information is in the present context taken to mean to make the signal or information available for analysis and/or storage (e.g. to 'store' or 'write' the signal or information in a memory).

In an embodiment, the extracted information about frequency or channel usage of specific received RFID signals and/or an expected reply of a responding tag at the same or a different channel is used in combination with a time stamp of said RFID signals to avoid the usage for transmission and/or reception of such frequencies or channels to and/or from another device for a specific minimum period of time, $T_{min}$, from the last detected use. In an embodiment $T_{min}$>30 s, such as >60 s, such as >120 s, such as >1000 s.

In an embodiment, a receiving mode is provided, wherein a certain bandwidth of the spectrum (e.g. an unlicensed part of the spectrum, e.g. 865-868 MHz) is scanned for a certain period (e.g. 10 s or 20 s) to determine, which of the RFID channels are used by a proximate RFID system. In an embodiment, the use of transmission and/or reception channels of the portable communications device is controlled by this information. In an embodiment, this scheme is coupled with a minimum time constant from the last detected usage (e.g. from the last scan) of the frequency channels in question to disallow such usage if less than a predefined time has passed since such detected usage. In an embodiment $T_{min}$ is equal to 100 ms or 1 s or 10 s or 100 s.

In a particular embodiment, the method comprises identifying a communications frequency, frequency range or channel used in the environment surrounding the portable communications device, thereby identifying possible interference with a frequency, frequency range or channel used or intended to be used by the portable communications device.

In a particular embodiment, the source of the interference is determined by identifying a memory location that replicates the information extracted from the currently captured RFID-signal, optionally utilizing possible additional characteristics of the RFID signal stored at that memory location.

It is intended that the structural features of the device described above, in the detailed description of 'mode(s) for carrying out the invention' and in the claims can be combined with the method, when appropriately substituted by a corresponding process (and vice versa). Embodiments of the method have the same advantages as the corresponding systems.

In a further aspect, a data processing system is provided, the data processing system comprising a processor and program code means for causing the processor to perform at least some of the steps of the method described above, in the detailed description of 'mode(s) for carrying out the invention' and in the claims. In an embodiment, the program code means at least comprise the steps denoted b) and c). In an embodiment, the program code means at least comprise some of the steps such as a majority of the steps such as all of the steps of the method. In an embodiment, the data processing system form part of a portable communications device as described above, in the detailed description of 'mode(s) for carrying out the invention' and in the claims. In an embodiment, the processor is the processing unit of a portable communications device as described above, in the detailed description of 'mode(s) for carrying out the invention' and in the claims.

In a further aspect, a computer readable medium is provided, the computer readable medium storing a computer program comprising program code means for causing a data processing system to perform at least some of the steps of the method described above, in the detailed description of 'mode(s) for carrying out the invention' and in the claims, when said computer program is executed on the data processing system. In an embodiment, the program code means at least comprise the steps denoted b) and c). In an embodiment, the program code means at least comprise some of the steps such as a majority of the steps such as all of the steps of the method.

Further objects of the invention are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise. Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out. Throughout, the same reference numerals are used for identical or corresponding parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1:
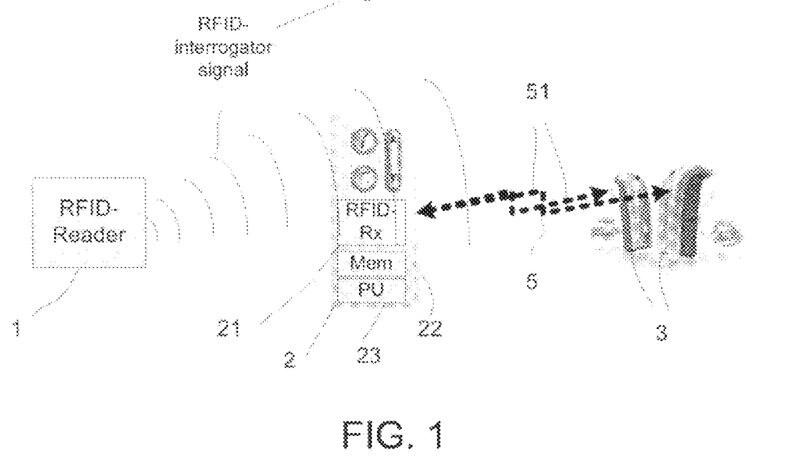
FIG. 1 shows an embodiment of a portable communications device according to the invention.
Figure 5:
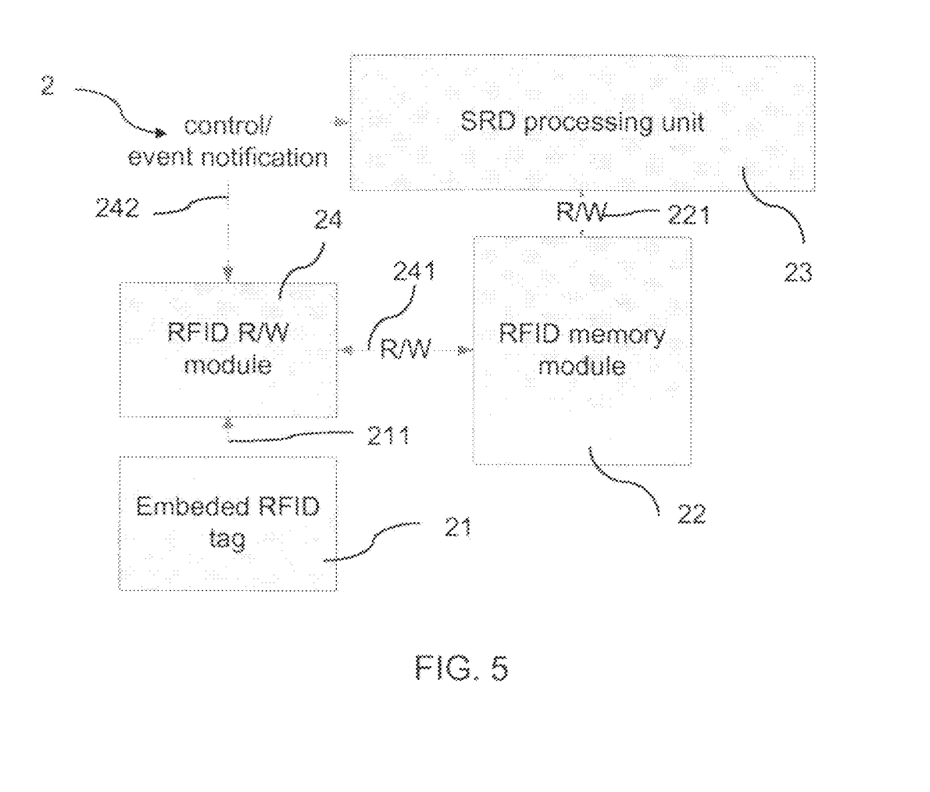
FIG. 5 shows a block diagram for possible implementation of the proposed solution within a SRD device or system.
Figure 6A:
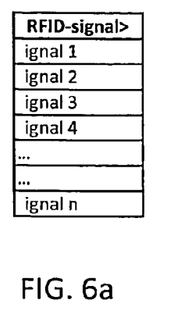
FIG. 6 shows examples of RFID-signals and corresponding characteristics stored in a memory of a portable communications device according to an embodiment of the invention.

FIG. 1 shows an embodiment of a portable communications device according to the invention. In the following the terms 'portable communications device' and 'short range device' (SRD) are used interchangeably. In the embodiment of FIG. 1, a portable communications device 2 in the form of an audio transmission device (e.g. a music player or an audio selection device for transmitting a selected one of a multitude of audio signals) for transmitting an audio signal to another device, here a pair of hearing instruments 3, is shown. The portable communications device 2 comprises an RFID recorder 21 (RFID-Rx in FIG. 1), for receiving an RFID-signal 6 transmitted from an RFID-interrogator 1 (RFID Reader in FIG. 1), a Memory 22 for storing received RFID-signals in different locations in the memory (cf. FIG. 6a) and an processing unit 23 (PU in FIG. 1) for analyzing at least some of the RFID-signals stored in the memory 22. In the embodiment of FIG. 1, the portable communications device 2 and the hearing instruments 3 each comprise a wireless interface (i.e. corresponding respective transmitter and receiver units) for setting up a communications link 5 between them. The communications link is shown to be 2-way (cf. arrows 51 between the portable communications device 2 and each of the hearing instruments 3), but might alternatively be one-way from the portable communications device 2 to each of the hearing instruments 3. The RFID recorder may e.g. comprise or be constituted by one or more, different, RFID tags (whose response function is disabled), which are individually coupled to (or multiplexed to one input to) a read/write unit (cf. 24 in FIG. 5) for extracting the information (RFID signal) from each tag and store it in the memory 22. Alternatively, the RFID recorder may be a dedicated receiving unit adapted to be able to receive a multitude of RFID signals and interface to or comprise a read/write unit. A block diagram of parts of an embodiment of a portable communications device according to the present invention is shown in FIG. 5.

In the following, two different examples are described, one related to the efficient spectrum usage, and the second one to the utilization of the RFID-system to employ proper spectrum usage rules.

Embodiments of Type 1: Efficient Spectrum Usage in the Unlicensed UHF Band

A wireless short-range communication system consisting of three communicating nodes is considered. The system comprises two hearing instruments (HIs) and a remote-control device, which are operating in a certain frequency band. If the system detects external interference during its operation, it is adapted to consider changing the frequency channel. Note that the operation of changing the frequency channel involves transmission of signalling packets among the communicating nodes. In conventional approaches, the most information that such a system can get about the interference is its power or some statistics on the time patterns of its occurrence. Considering the future horizon in the unlicensed spectrum, it is a likely scenario that the interference is coming from an RFID reader. Now, assume that one of the 3 communicating nodes has an embedded RFID tag (say, the remote control). Then, when considering the interference experienced, the device can read if it has been due to an RFID reader by simply checking the memory location that replicates the information read by the RFID tag. Even more, once it has detected that there is indeed an interfering RFID system, it can infer further information about the operation of that type of RFID system: E.g. what is the duty cycle, what is the channel usage pattern, whether the tags will reply at the same or a different channel etc. All this information can be used to create various algorithms for efficient selection of the operating channel.

In this example a possible way to use the embedded RFID tag for avoiding the interference in the unlicensed UHF band 865-868 MHz is illustrated. In the following, we describe the planned frequency operation in this band. The description for the spectrum usage in these RFID systems is based on the ECC Report 037 (2008).

Figure 2:
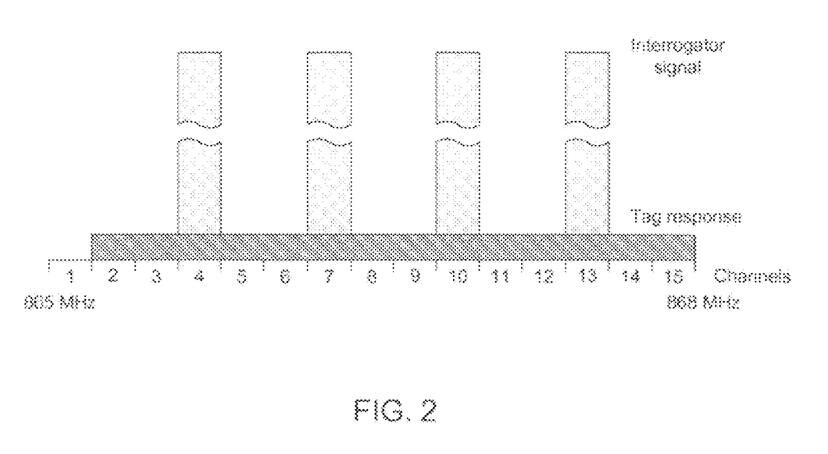
FIG. 2 shows the configuration of the four channels that are set to be used by the RFID systems in the band 865-868 MHz, cf. ETSI TR 102 649-1 (April 2007).

The transmit signal from an RIFD reader (interrogator) may be at a power level of up to 2 W e.r.p. (effective or equivalent radiated power) and is occupying the centre channel of 200 kHz bandwidth. The two channels on each side of the transmit channel of the RFID-reader are reserved for the backscatter response from the tag. Typically tags will respond at offset frequencies of approximately 200 kHz or 300 kHz, which is set by the configuration of the interrogator. The power level of the response from a tag will be −20 dBm e.r.p. or less depending on its distance from the interrogator and the nature of the material to which it is attached. Based on this operation mode, it has been proposed to allocate four channels for high-power use (i.e. e.g. by an RFID reader/interrogator), e.g. channels 4, 7, 10, 13 as shown in FIG. 2, cf. ETSI TR 102 649-1 (2007). In FIG. 2, the band from 865 MHz to 868 MHz is split into 15 channels of equal width, each channel thus representing a bandwidth of 200 kHz, and channel 1 extending from 865.0 MHz to 865.2 MHz, etc.

Figure 6B:
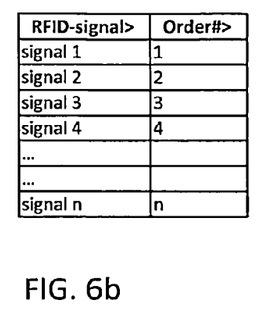
Figure 6C:
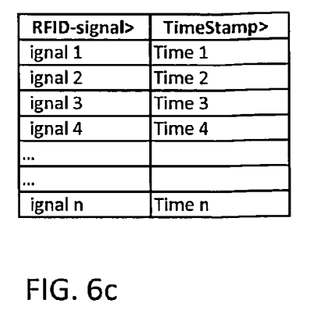
Figure 6D:
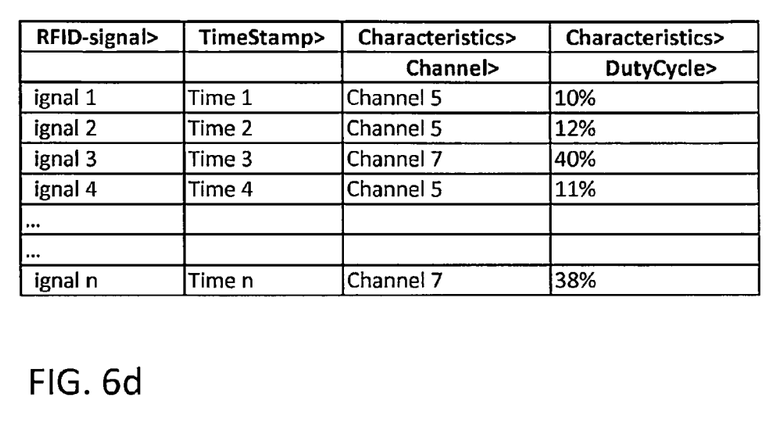
Figure 6E:
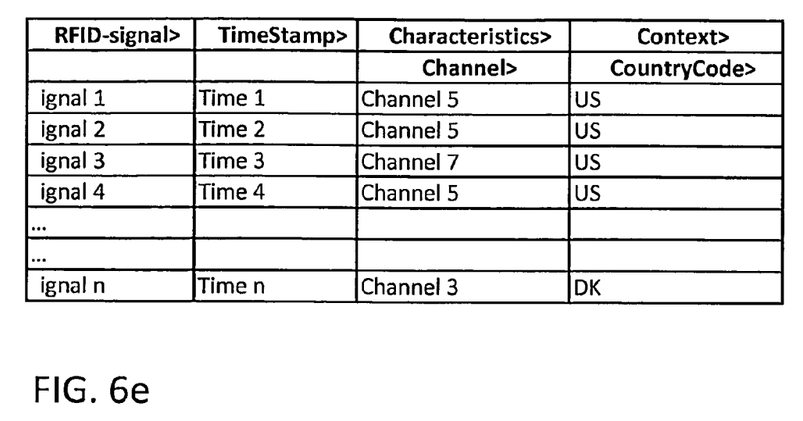
Figure 6F:
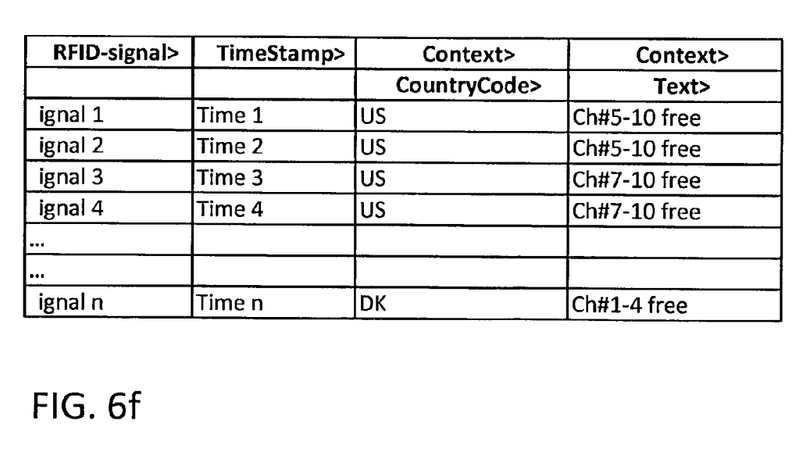

Now let us consider a short-range device (SRD) that has an embedded RFID tag. Assume that this SRD uses 10 channels in the 865-868 MHz band, with each channel having a bandwidth of 300 kHz, see FIG. 3. As a reference, the 4 channels for RFID reader transmission are plotted. It can be seen that the channels 3, 5, 7, and 9 can be interfered by a transmission from the proximate RFID reader. The SRD uses the 10 available channels in a flexible way, which in general, is a form of adaptive frequency hopping: The device tries to select a frequency channel for communication that is less likely to experience interference. Assume that in its nominal operation mode, the SRD can choose any of the 10 channels and transmit a packet, then for the next packet choose another of those 10 channels, etc. Next, assume that the embedded RFID tag operates as follows: Whenever the RFID tag detects a valid signal from an RFID reader, it sends a signal to the processing unit of the portable device and the portable device records the information read from the RFID reader along with a sequential order of capture (cf. FIG. 6b) or a time-stamp (cf. e.g. FIG. 6c-6f), that is the value of the local time for the portable device in order to record when the RFID reader has sent its signal. One can think that in the device there is a RFID log file where the events from the embedded RFID tag are written. The device can use this information from the embedded RFID tag to facilitate the selection of the frequency channel in many ways and in the following three examples are outlined.

Figure 3:
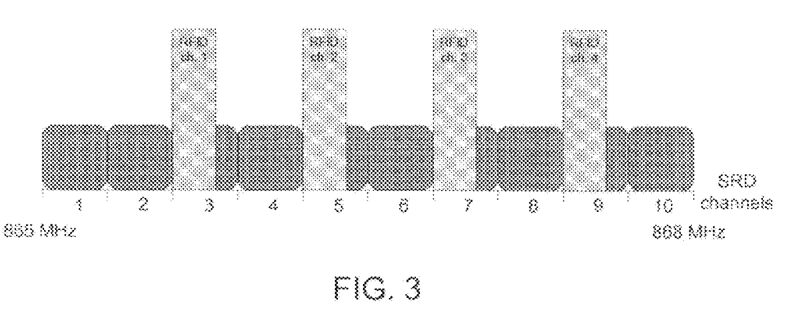
FIG. 3 shows a possible diagram of ten 300 kHz channels for a SRD system in the band 865-868 MHz band.
Figure 4:
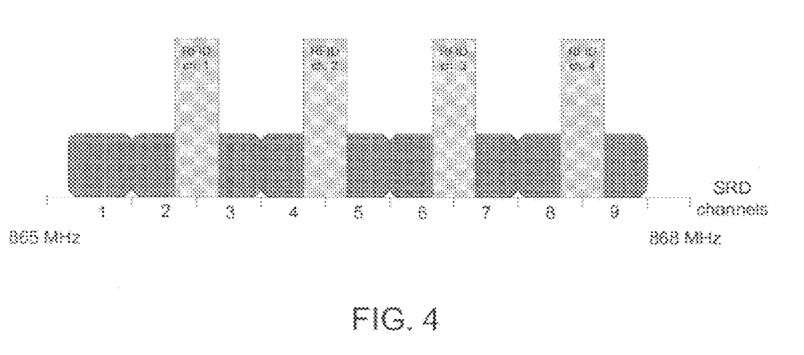
FIG. 4 complements FIG. 3 by showing that it is not necessary that one RFID channel overlaps only with one channel of the SRD system.

FIG. 4 complements FIG. 3 by showing that it is not necessary that one RFID channel overlaps only with one channel of the SRD system. In this figure, the same frequency range between 865 MHz and 868 MHz is used, and again the bandwidth of the SRD channel is 300 kHz. However, only 9 channels are defined and the centre frequencies of these channels are shifted with respect to the centre frequencies for the channels described in FIG. 3. In this example we can see that RFID channel 1 (RFID ch. 1 in FIG. 4) overlaps with two SRD channels (2 and 3).

Example, Use 1: Interference-risk=f(channels used). The SRD checks the log file of the embedded tag and, if it detects that a valid signal from a RFID reader appears, then it suppresses the usage of the channels 3, 5, 7, 9 (these channels (here) being allocated to RFID-readers, RFID ch. 1 to RFID ch. 4 in FIG. 3, 4). This means that the SRD has entered into a location where RFID readers are deployed and there is a high chance to experience interference at these channels. After suppressing these channels, the SRD again monitors the log file of the embedded RFID tag. If, during a certain period of time (e.g. 1 or 2 minutes) no valid RFID reader signal is detected, that means that the SRD is outside the interfering zone of the RFID reader and it can again use the channels 3, 5, 7, 9. This simple usage can have implications on the future regulations. Namely, with the embedded RFID tag a SRD can successfully detect presence/absence of a RFID system in its close proximity and, in the absence of such a system, it can use the channels 3, 5, 7, 9. In the absence of such an embedded RFID tag, the SRD should normally always suppress the channels 3, 5, 7, 9, thereby decreasing the efficiency of the spectrum usage.

Example Use 2: Interference-risk=f(channels identified by frequency scanning). In a more advanced usage, after detecting a valid signal from the RFID reader, the SRD can initiate a spectrum sensing procedure: the SRD can go in a receiving mode and scan the whole relevant bandwidth (e.g. 865-868 MHz in this example) for a certain period (e.g. 10 seconds) in order to find out which of the four RFID channels are used by the proximate RFID system (cf. e.g. FIG. 6d, 6e). If it turns out that, for example, only one channel is persistently used, e.g. the first RFID channel from FIG. 2, in the RFID system, then the SRD will suppress only its channel 3, but it will continue to use the channels 5, 7, and 9.

Example Use 3: Interference-risk=f(time after experienced channel use). If the SRD enters into an area which is heavily populated by many tags, then the interference experienced from the replies that the tags send to the interrogator can be significant. This can happen if the SRD is brought into an area that has many tagged items, such as a warehouse. From the prescribed operation of the RFID system, it follows that the tag replies are sent always in the adjacent channel to the channel at which the RFID reader sends its signal. For example, assume that at the time $t_1$ the SRD uses channel 4 for communication and it experiences a transmission error. Then it looks in the log file of the embedded tag and finds out that at the time $t_0$, just before the time $t_1$, the embedded tag has recorded a valid signal form an RFID reader. In that case, it is likely that the RFID reader has sent the signal on either its first or the second channel (that are adjacent to the channel 4 of the SRD, cf. e.g. FIG. 3) and the packet communicated by the SRD was in error due to the aggregated interference from the tags that reply to the readers. In this example, for simplicity, this conclusion is made after only one packet error, but a more elaborate procedure can advantageously be applied, which collects statistical data for several packet errors that are close in time and correlate these errors with the detected activity of the RFID reader in order to conclude whether the interference comes form the replies sent by the tags.

There are several ways to use this knowledge, here we exemplify two:
- If the frequency at which the RFID reader has transmitted its information is known (e.g. by the procedure used in the Example use 2), then the SRD can operate as follows: immediately after detecting a valid signal from the RFID reader, it will avoid to use the channels that are adjacent to the channel used by the RFID reader.
- If the frequency of the RFID reader is not known or is changing constantly, then in the short period (the duration can be, for example, equal to the typical duration of a packet sent by an RFID tag) after detecting a valid RFID reader signal, the SRD can avoid to use the frequencies that overlap with the adjacent channels of all the 4 RFID reader channels.

Embodiments of Type 2: Location, Environment and Context Awareness

One of the problems in the spectrum usage for short-range devices around the 900 MHz band is that there is no band that is worldwide available, as well as the facts that the operating rules may differ from country to country. Clearly, it would be very annoying for the user of hearing aids to have to care about the country where he/she resides temporarily and try to input that information manually to the hearing aid system.

The idea of using embedded RFID tag can be also of a great assistance here. The remote device that contains the RFID tag may record the recent information collected form the RFID readers. Based on this information and by using pre-stored information (or even access to databases via a wireless connection), the remote device can figure out in which country the person is at the moment and thus apply the spectrum usage rules for that country. In an "easy" example, such information can be collected by detecting the information from the RFID readers at the crossing of the country border.

It is likely to envision a future in which the RFID readers can advertise certain information that is specific to the environment or the context that is relevant in the proximity of the RFID reader. In short, the environment becomes perceptible by the SRD by only passively collecting the wireless information form the proximate RFID readers. Here are several embodiments pertaining to such usage of the embedded RFID tag:

Example Use 1: If the reader broadcasts the code of the country in which it is situated (e.g. at the border-crossing), then the SRD can employ the spectrum usage rules that are intended for that country, cf. e.g. FIG. 6e. The country code scheme used can be any appropriate unique identification of the country (or federal state or other geographical area having its own spectrum usage). One example could be the ISO 3166-1 scheme as specified by the International Organization for Standardization. Another could be the national dialling codes as specified by the International Telecommunication Union (ITU).

Example Use 2: The novel paradigm in spectrum regulation is the dynamic spectrum access, which is expected to get a momentum in the coming years. In short, in the dynamic spectrum access the frequency bands are not simply divided into licensed (like the GSM spectrum) or unlicensed (like the UHF 865-868 MHz or the 2.4 GHz ISM band), but there will be other models of spectrum usage—temporary renting, usage with guaranteed interference, etc. In all these scenarios, it is of crucial importance that the radio devices that are capable of dynamic spectrum access can learn their radio environment—i.e. which channels can be used in a given location and given time, etc. (cf. e.g. FIG. 6f). Such a relevant spectrum information can be locally advertised by RFID readers and, upon detection of such an RFID signal by the embedded RFID tag, the device can get the relevant knowledge for the dynamic spectrum access (e.g. that a certain channel X is available for use in the next 2 hours). Clearly, such an RFID system should be itself connected to a system for spectrum monitoring, which can provide the relevant spectrum information.

Example Use 3: Establish a predefined connection based on information received from RFID, e.g. 'vicinity of TV'=>connect to streamed TV-sound, etc. Many SRDs operate as ad-hoc networks which means that they establish communication links "on a fly", such as for example a connection between two Bluetooth devices or a WiFi connection from a laptop to an access point. However, the problem in this link establishment is that, the procedure for discovering other devices is very power consuming, because it uses intensive wireless transmissions. Thus, for example, a user with wireless-enabled hearing instruments (HI) would prefer that, whenever she is back at home and the TV is on, the HI should connect to the TV (sound) directly. For that to be possible the His should be able to detect when the user is in the proximity of the TV, otherwise they should constantly run a protocol for discovering the TV which consumes power and thus reduces rest-battery operation time. However, if the TV is provided with an RFID interrogator for advertising information of the TV presence, such information can be captured by the embedded RFID tag (recorder) (which is either in the His or in a third auxiliary device that is able to communicate with the His, e.g. a remote control and/or an audio selection device) and a connection can be seamlessly established. This example usage can be easily generalized to the advertisement of any type of service to which a given wireless device (with embedded RFID tag) might need to connect.

Possible Implementation

FIG. 5 depicts a block diagram according to which the proposed device or system 2 can be implemented. The Embedded RFID tag 21 is able to receive the RF information transmitted by the proximate RFID readers. In this embodiment, the RFID R/W (read/write) module 24 acts as a receiver of the RF information 211 received by the Embedded RFID tag—it down-converts the information to the baseband, decodes the information contained in the packet sent by the RFID reader and uses that information 241 to create a log (record, cf. e.g. FIG. 6) in the RFID memory module 22. Alternatively, in principle, each Embedded RFID tag should be able to decode the information from the RFID reader in order to decide whether it is eligible to send a reply. Hence, any decoding module that can interpret the RFID baseband signals can be used. It might not necessarily be as simple as the one used in the RFID tags. An active decoder (i.e. using battery and processing power) can be used to gain reliability. The RFID memory module consists of RFID records (or logs). A single log contains the information that is obtained from a single packet captured form the transmission of the RFID readers (cf. e.g. FIG. 6a). A log can contain additional information, for example a time stamp (cf. e.g. FIG. 6c) that denotes when the information has been received or a GPS information about the location at which that particular RFID packet has been recorded etc. The SRD processing unit 23 uses the information 221 from the RFID memory module as input to various algorithms, as described above—for example to an algorithm for channel selection. The SRD processing unit 23 can send control information 242 (control/event notification in FIG. 5) to the RFID R/W module 22—e.g. to instruct it about how often it should receive RFID information (i.e. read and decode the information captured by the Embedded RFID tag 21). In the other direction 242, the RFID R/W module can notify the SRD processing unit about relevant events—e.g. that it has detected an RFID reader in the vicinity, such event prompting the SRD processing unit to check the RFID memory module. Both RFID R/W module and the SRD processing unit are able to write in the RFID memory module (cf. signals 241 and 221, respectively)—the SRD processing unit might add certain information, such as time, location or context information (cf. FIG. 6), or it can delete a record that is obsolete.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims. For example, instead of having a single tag, there can be multiple embedded tags in a device. This can be done to increase the reliability of capturing the proximate RFID signals.

References

US 2007/0063818 A1 (INTERMEC IP CORP) 22-03-2007

ERC/REC 70-03, ERC Recommendation 70-03 relating to the use of short range devices (SRD), version of February 2008.

ECC Report 037, "Compatibility Of Planned SRD Applications With Currently Existing Radiocommunication Applications In The Frequency Band 863-870 MHz," Revision from May 2008.

ETSI TR 102 649-1, "Electromagnetic and radio spectrum matters; Technical characteristics for RFID in the UHF band; System Reference Document for Radio Frequency Identification (RFID) equipment Part 1: RFID equipment operating in the range from 865 MHz to 868 MHz" (April 2007)

The invention claimed is:

1. A method of for transmitting streamed audio data to a hearing device from a portable communications device, in an environment with interference caused by one or more RFID-signals emitted from RFID interrogators or RFID tags surrounding the portable communications device, the method comprising:
   detecting presence of the interference caused by the one or more RFID-signals in a channel or a frequency range used to communicate by the portable communications device with the hearing device;
   capturing, including receiving and decoding, said one or more RFID-signals from the RFID interrogators or the RFID tags surrounding the portable communications device;
   storing said one or more RFID-signals in a memory of the portable communications device together with a sequential indicator;
   analysing the stored RFID-signals with a processing unit of the portable communications device;
   selecting a frequency range or channel of a wireless communication interface of the portable communications device for transmitting a streamed audio signal from said portable communications device to said hearing device to avoid the detected interference based on results of the analysing; and
   transmitting said streamed audio signal on the selected frequency range or channel.

2. A method according to claim 1, further comprising:
   extracting information from the stored RFID-signals facilitating decisions to be made on spectrum usage in an environment surrounding the portable communications device.

3. A method according to claim 1, further comprising:
   extracting a country code from the captured RFID-signals; and
   determining the country of location of the portable communications device based on the extracted country code from the captured RFID-signals.

4. A method according to claim 1, further comprising:
   determining allowed frequencies and power levels to be used in the wireless communication interface communicating to the another device based on the captured RFID-signals.

5. A method according to claim 1 wherein the sequential indicator is an order number indicating an order of occurrence or a time stamp indicating the point in time of the captured RFID-signals.

6. A method according to claim 1, wherein the analysing includes:
   determining a duty cycle of the captured RFID-signals.

7. A method according to claim 1, wherein the analysing includes:
   identifying the captured RFID-signals as originating from an RFID interrogator; and
   predicting a channel or frequency used by an RFID tag responding to said RFID interrogator.

8. A method according to claim 7, wherein the selecting includes:
   designating the channel or frequency predicted to be used by the RFID tag responding to said RFID interrogator as a channel or frequency to avoid for communication between the portable communications device and the another device for a predetermined time period.

9. A method according to claim 1, wherein
   the capturing includes scanning a predetermined bandwidth of spectrum for a predetermined period of time, and
   the analysing includes identifying RFID channels in use during said predetermined period of time.

10. A method according to claim 1, wherein
    the analysing includes identifying potential interference frequencies or frequency ranges based on a record of the RFID-signals stored in the memory, and
    the selecting includes avoiding the identified potential interference frequencies or frequency ranges for communicating with the another device.

11. A communication system for transmitting streamed audio data between a first communication device and a hearing device in the presence of radio frequency interference, the system comprising:
    an RFID reader configured to read RFID tags, said RFID reader transmitting one or more RFID-signals, the one or more RFID-signals causing the radio frequency interference; and
    the first communication device, including
        an audio transmission device configured to transmit a streamed audio signal,
        a wireless communications interface, including a selectable reception frequency range or channel and a selectable transmission frequency range or channel, configured to communicate with the hearing device, the wireless communication interface further configured to detect presence of the radio frequency interference caused by the one or more RFID-signals transmitted from the RFID reader in a channel or a frequency range used to communicate with said hearing device,
        a memory,
        an RFID recorder configured to receive the one or more RFID-signals transmitted from the RFID reader, the RFID recorder further configured to store previously received RFID-signals in the memory, and
        a processing unit notified of the detected radio frequency interference and configured
            to analyze the one or more RFID-signals causing the detected radio frequency interference received by the RFID recorder, and
            to select a new frequency range or channel of the wireless communication interface for transmitting the streamed audio signal to the hearing device based on results of the analysis of the one or more RFID-signals to avoid the detected radio frequency interference.

12. The communication system according to claim 11, further comprising:
    the hearing device, wherein
    the processing unit is further configured to identify a frequency range or channel of the detected radio frequency interference based on the analysis of the one or more RFID-signals,
    the processing unit is further configured to select a frequency range or channel different from the identified frequency range or channel of the radio frequency interference, and
    the wireless communication interface is configured to transmit audio information on the selected frequency range to the hearing device.

13. A portable communications device for transmitting streamed audio data to a hearing device, comprising:
    a wireless communications interface, including a selectable reception frequency range or channel and a selectable transmission frequency range or channel, the wireless communication interface configured to communicate with the hearing device, the wireless communication interface further configured to detect presence of interference caused by one or more RFID-signals transmitted from an RFID-interrogator in a channel or a frequency range used to communicate with said hearing device;
    a memory;
    an RFID recorder configured to receive the one or more RFID-signals transmitted from the RFID-interrogator, the RFID recorder further configured to store previously received RFID-signals in the memory; and
    a processing unit notified of the detected interference and configured to analyze at least some of the RFID-signals stored in the memory, the analyzing by the processing unit including extracting particular information contained in the received one or more RFID-signals causing the detected interference, wherein
    the processing unit is further configured to select a frequency range or channel of the wireless communication interface for transmitting a streamed audio signal to said hearing device based on results of the analysis of the received RFID-signals to avoid the detected interference.

14. A portable communication device according to claim 13, wherein the RFID recorder is configured to record signals in an unlicensed frequency range.

15. A portable communication device according to claim 14, wherein said unlicensed frequency range comprises frequencies between 863 MHz and 870 MHz or frequencies between 2.40 GHz and 2.5 GHz.

16. A portable communication device according to claim 13, wherein
    the wireless communications interface is configured to detect interference from an RFID-signal transmitted from an RFID-interrogator.

17. A portable communication device according to claim 16, wherein
    the wireless communications interface is configured to use the detected presence of interference to control use of transmission and/or reception channels of the portable communications device by suppressing use of the identified channels used by the RFID-system comprising an RFID-interrogator and its corresponding RFID tags and to allow use of channels not used by the RFID-system.

18. A portable communication device according to claim 13 comprising a mobile phone.

* * * * *